United States Patent [19]

Tartaglino

[11] Patent Number: 5,277,397
[45] Date of Patent: Jan. 11, 1994

[54] BLADDER ASSEMBLY FOR CONTROL OF FLUID FLOW AND METHOD OF ITS FABRICATION

[76] Inventor: Jerry J. Tartaglino, 4103 Pecan Orchard Rd., Parker, Tex. 75002

[21] Appl. No.: 15,524

[22] Filed: Feb. 9, 1993

[51] Int. Cl.⁵ .............................................. F16K 3/00
[52] U.S. Cl. .................................... 251/61; 251/212; 137/907; 236/49.4
[58] Field of Search ............................. 251/61, 5, 212; 137/907; 236/49.4

[56] References Cited

U.S. PATENT DOCUMENTS

| | | | |
|---|---|---|---|
| Re. 29,302 | 7/1977 | DeLepeleire | 251/61 X |
| 2,800,920 | 7/1957 | Smith | 251/61 |
| 2,898,080 | 8/1959 | Smith | 251/82 |
| 3,009,473 | 11/1961 | Hennen | 251/212 |
| 3,126,029 | 3/1964 | Englesson | 251/61 X |
| 3,147,768 | 9/1964 | Kennedy | 251/212 |
| 3,465,814 | 9/1969 | Heck et al. | 236/49.4 X |
| 3,494,588 | 2/1970 | Kisling | 251/5 |
| 3,588,036 | 6/1971 | Harter | 251/61 |
| 4,006,754 | 2/1977 | Houston | 251/61 X |
| 4,040,564 | 8/1977 | Waeidner et al. | 236/49.4 |
| 4,186,876 | 2/1980 | Clark et al. | 236/49.4 |
| 4,506,830 | 3/1985 | Francel | 236/49.4 |
| 4,614,152 | 9/1986 | Fukasaku et al. | 281/61 X |
| 4,703,913 | 11/1987 | Hunkapiller | 251/61.1 |
| 4,783,045 | 11/1988 | Tartaglino . | |
| 5,016,856 | 5/1991 | Tartaglino | 251/61 |

*Primary Examiner*—A. Michael Chambers
*Attorney, Agent, or Firm*—Charles F. Schroeder

[57] ABSTRACT

A bladder type damper assembly formed of a flexible envelope of fluid impermeable plastic material incorporating an insert made of two segments of rigid sheet material joined in hinged relation at one edge and moveable between a flat association and a preselected open angular orientation. The fluid conformable portion of the bladder envelope between the open edges of the insert segments provides a folding region in the form of a valley configuration provided by seaming the two overlapping layers of the bladder between the two insert segments when folded in flat relation. The seam is formed by applying heat and pressure to the two bladder layers through an opening in one or both of the insert segments with separator material appropriately placed.

14 Claims, 5 Drawing Sheets

BLADDER ASSEMBLY FOR CONTROL OF FLUID FLOW AND METHOD OF ITS FABRICATION

FIELD OF THE INVENTION

The present invention is an improved bladder type damper or shut off valve assembly for control of fluid flow in a channel such as air flow in a heating and cooling air conditioning duct system of an automotive vehicle and which can be operated by inflating or deflating the bladder, such as with air or other gases as may be available for control in an automotive vehicle. More specifically the invention is a bladder assembly which functions somewhat like a clam shell type valve which lends itself to closure of its top and bottom sides into a compact form to reduce resistance to fluid flow in a channel and opening of its sides into an expanded condition to obstruct flow in the channel. The top side as described herein acts as a gate for control of fluid flow while the bottom side acts as a base for mounting the assembly. In addition a novel method of fabricating the new assembly is encompassed within the invention.

The bladder type valve of the invention can be made to any number of a wide range of sizes to match standard or unusual size ducts into which it can be inserted. In this respect the valve can be additionally adjusted to a desired duct size by providing an attached blade member which can be sized for operational association with the top side of the assembly. A minimum or no mechanical surgery of existing systems is necessary, such as is usually entailed in installation of the commonly used prior art butterfly plates or vane type dampers in heating and air conditioning systems. Other related type bladder assemblies of different structure are described in my U.S. Pat. Nos. 4,783,045 and 5,016,856 which are also readily adaptable to use in fluid flow channels and to operation by expansion and contraction for control of fluid flow through such passages.

It is a broad object of the present invention to provide a bladder assembly adaptable to contraction and expansion for use in control of fluid flow in a channel and which can be reliably operated for hundreds of thousands of cycles responsive to condition signals such as temperature and humidity in a zone supplied with fluid passing through the channel.

It is another and more specific object of the invention to provide a compact bladder type damper or shut off means for heating and cooling air conditioning systems of motor vehicles wherein the bladder assembly can be operated by connection to the exhaust system of the vehicle or to an auxiliary negative pressure source provided in the vehicle.

SUMMARY OF THE INVENTION

The invention is an improved bladder type assembly operable as a damper or shut off valve and the method of making the assembly. The assembly is made having a flexible envelope of fluid impermeable plastic material which provides the major exposed surfaces of the assembly. Incorporated in the envelope is an insert made up of two side-by-side segments of rigid sheet material which are joined in hinged relation at one edge to permit the segments to be angularly oriented relative to each other. The segments can be folded flat in overlapping relationship or can be angularly oriented in any of a number of positions between such flat association or zero degrees and a 90 degrees angular relationship between the two segments. A predetermined normal angular setting might be any angle between about 30 and 70 degrees and most frequently is set at a normal angle of about 50 degrees.

The structure of the invention as exemplified herein is a longitudinal inflatable fluid-impermeable bladder type damper or shut-off valve assembly designed to fit in crosswise position in a flow channel. The rigid segments are moveable toward each other, and in normally open position have a generally right angular relationship or less extending from an intermediate bending region between them. A fluid conformable portion of the bladder envelope between the open edges of the rigid segments is shaped for a consistent pattern of overlay of the inbetween portions of the envelope upon closure of the segments.

The assembly can be arranged to be biased in a normally open position for deflation with its moveable segments at their widest angle, or can be biased in a normally closed position for inflation with its sides in flat overlapping relation. The bladder assembly is principally described herein in its biased open position subject to being closed into a collapsed or flattened condition by evacuation upon connection to one or more negative pressure sources.

A novel aspect of the invention is its clam shaped-like configuration in which the portion of the flexible envelope extending between the open side edges has formed therein a valley-shaped depression in the region between the outer edges of the two side segments. The valley-shaped depression extends along the length of the bladder assembly between points near the opposite end regions of the assembly. The depression in the fluid conformable midregion is formed by securing the opposite ends of th midregion of the envelope to the ends of the rigid side segments of the insert, and particularly to the corner edges of the bladder caused by its close fit relation of the envelope with the ends of the side segments. The conformable mid-portion is thereby drawn tautly into the depressed valley configuration of the open assembly by tension acting on the midregion applied diagonally downward to the end regions of the open segments. That is when biasing means is arranged to bias the two sides of the assembly in a normally open position, the outer edges of two segments act cooperatively with the anchored ends of the membrane to impart the desired valley configuration between the two side segments. This shape is particularly advantageous in facilitating reliable opening and closing of the bladder according to a defined predictable foldover pattern in the midregion during operation of the assembly.

A novel method of fabrication is utilized to provide the valley configuration in the conformable bladder portion between the rigid sides. The valley shape is imparted to the conformable portion by merging together in seam-like relationship a selected linear region of the two overlapping portions of the flexible bladder envelope while folded inbetween the side segments when the assembly is in flattened or closed condition. The envelope is made of heat and pressure sealable material such as a polyester elastomer like that sold under the name "HYTREL", a registered trademark of the DuPont Corporation. The formation of the seam between the two adjacent portions is accomplished by heat and pressure through a slot opening or a broader opening in at least one side segment of the insert. That is, while the two side segments of the insert are in flattened condition, an opening such as a slot provided in at least one side segment permits access through its outer overlying layer of the bladder envelope to the two folded contacting layers inbetween the sides.

To prevent the outer layers of the envelope from being sealed through the slot to the layers inbetween, a strip layer of separator material is provided in association with the inner surface of the outer layer of the bladder in a position which falls in the region of the slot. Heat and pressure is applied, such as with an ironing member pressed through the outer layer of the bladder and through the slot, to the two contacting layers folded between the two side segments to effect formation of a linear merged relationship such as a seam between the two contacting layers for a length corresponding generally to the length of the slot. The slot is positioned generally in the midregion of the width of a side, preferably closer to the bending region of that side which permits formation of a wide angle or a deep valley in the envelope when the bladder assembly is in its open position. The slot length and the corresponding length of the seam formed therethrough falls short of the ends of the side in which it is located to provide sufficient length at the ends of the interseamed layers to promote the desired diagonal tensioning at the ends of the midregion for formation of the valley shape depression desired.

When the bladder assembly is biased to an open position as herein described suctioning of gas therefrom by application of a negative pressure thereto causes the assembly to close. That is, the application of a negative pressure to the assembly draws the two segments on each side of the bending region closer together, to a flattened compact association between the two sides of the assembly. Where it is desired to have the bladder assembly expand upon inflation, it can, as an alternate be biased toward a closed or flat condition from which it can be operated by supply of fluid thereto, such as air or other gas to expand the assembly.

A feature of the clam-shaped assembly of the invention in which two angularly oriented sides of fixed dimension and a valley configuration of the fluid conformable membrane material inbetween, as indicated is its reliability in operation upon evacuation of fluid from the bladder. The collapse of the flexible membrane portion between the two side segments as the bladder is evacuated is reliably predictable in its pattern of mating with the rigid sides. Upon evacuation of the bladder the flexible membrane portion forming the valley between the two sides collapses progressively from the outer edges of the two side segments and accordingly draws the two side segments together against the force of biasing means holding the two sides apart in an angular relation. Because of the reliable pattern of collapse of the bladder, additional functional features can be incorporated into the assembly among which is provision of a multiple stepped arrangement for positioning the gate segment which advantageously adds to the capabilities of the assembly to control fluid flow in a channel.

In this respect the invention as described herein is adaptable to accepting negative pressure applied to the assembly over two or more separately operated control paths, whereby the bladder can be drawn to one, two or more positions of closure of the bladder assembly toward a flush association between the two side segments.

Other objects and features which are believed to be characteristic of my invention are set forth with particularity in the appended claims. My invention however both in organization and manner of construction, together with further objects and features thereof, may be best understood with reference to the following description taken in connection with the accompanying drawings.

DESCRIPTION

Figure 1:
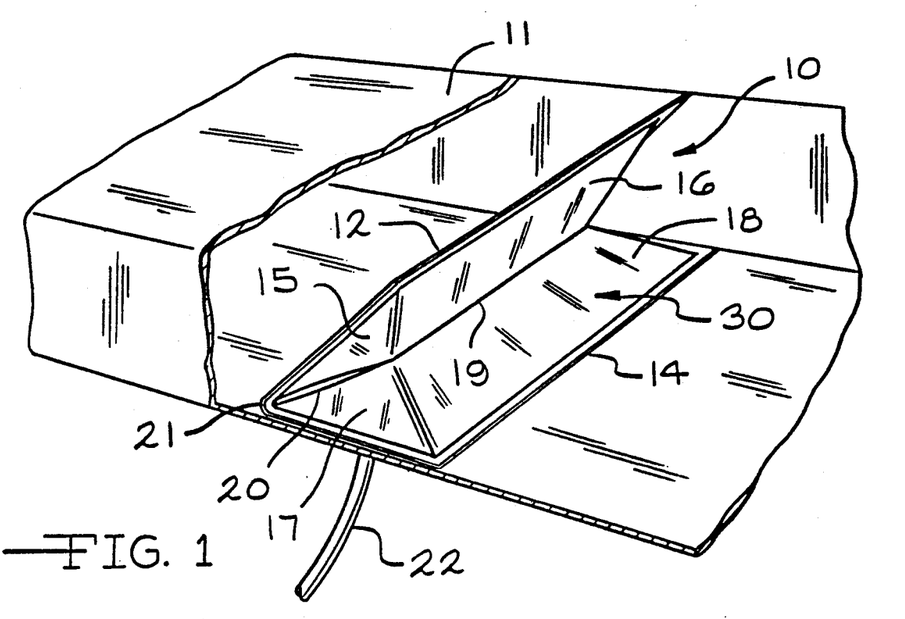
FIG. 1 is a somewhat schematic perspective view showing a bladder assembly of the present invention in a partially broken away air flow duct system.

Turning to the drawings in greater detail, FIG. 1 illustrates a broken away view of a duct 11 in which the invention in the form of a bladder assembly 10 is shown in crosswise position in the duct channel. A side 12 of the assembly moves up and down arcuately about a bending region 21 toward and away from an opposite side 14 of the assembly which side acts as a base for mounting the assembly 10 in the duct 11. A bladder envelope 30 completely encloses the internal insert assembly which provides the body and shape as well as the external surfaces of the assembly 10. By reason of its overlying relation with the insert assembly, the bladder envelope has produced therein a pocket 16 associated with the moveable side 12 of the assembly as well as a pocket 18 associated with the base side 14 of the assembly. The two pockets 16 and 18 are joined at a seam 19 formed at the mid-regions of the pockets 16 and 18 such as by heat and pressure sealing of the two together by the method of the invention hereinafter described. The seam 19 lies between the two sides 12 and 14 and extends between the end regions of the assembly 10 which in the foreportion of the illustration in FIG. 1 is represented by the confronting ends 15 and 17 of the pockets 16 and 18, respectively. The top side end region 15 and the bottom side end region 17 as well as the counterparts on the opposite end of the bladder seam 19 are drawn in tension under the biasing action provided by biasing springs 33 (FIG. 3) associated with the assembly 10.

Figure 2:
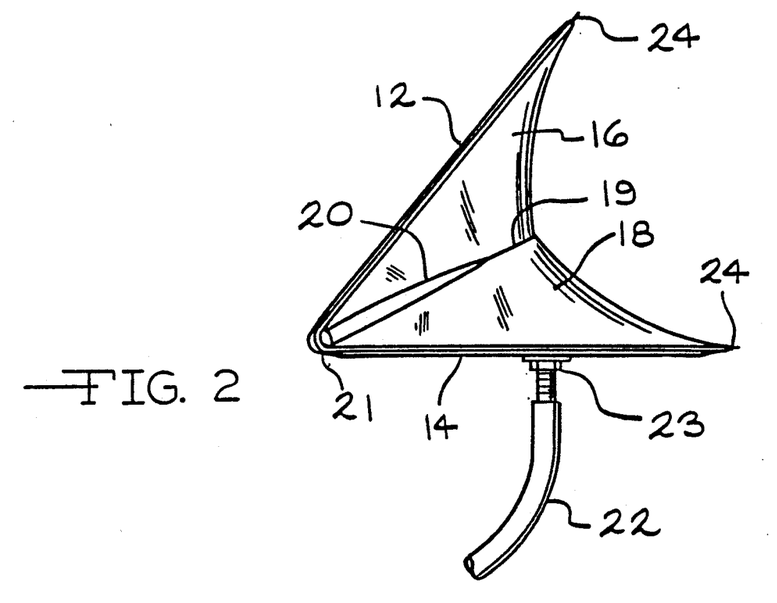
FIG. 2 is an end view of the bladder assembly of FIG. 1.

Tension of the bladder at the ends of the seam 19 cause formation of a valley between the two sides 12 and 14, as more clearly illustrated in the end view of the assembly 10 illustrated in FIG. 2. A suction tube 22 which is connected by way of a hollow set screw and nut 23 provides access to the interior of the bladder envelope 30 so that the gas contained therein can be withdrawn. This results in the moveable upper side or gate 12 of the assembly being drawn downwardly by the evacuation of pockets 16 and 18 to allow the otherwise blocked fluid flow in the duct 11 to move therethrough. The side 12 of the assembly can be moved toward the side 14 by reason of the assembly being bent about the bending region 21 A fold 20 behind the seam 19 resulting from joining the two pocket portions 16 and 18 at the seam 19 maintains the sealed relation between the two pockets as well as providing a continuous path for gas flow between the two pockets 16 and 18. The marginal region 24 of the bladder envelope 30, as illustrated, is formed by sealing the top and bottom layers of the envelope which in turn provide the marginal flexible sealing edge 24 which functions particularly as a seal for the moveable gate side 12 of the assembly With the side and top walls of the duct 11.

Figures 3, 4:
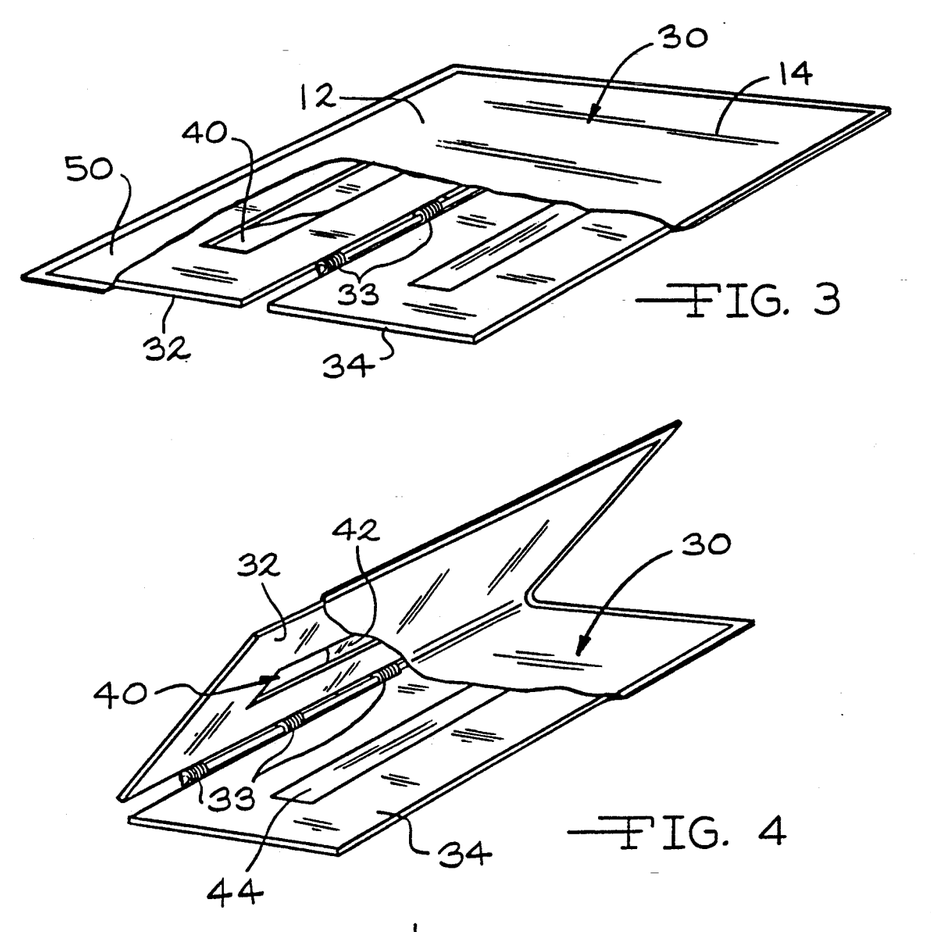
FIG. 3 is a perspective partially broken away view showing an insert having two rigid sheet segments joined at biasing means in a partially broken away flexible bladder envelope which provides the exterior surface of the bladder assembly of FIG. 1.
FIG. 4 is a perspective illustration of the spring biased assembly of FIG. 3 with the two side segments in angular position as it is in the flexible bladder envelope illustrated in FIG. 1.

FIG. 3 illustrates the form of the insert enclosed within the bladder envelope 30. A top segment 32 associated with the gate side portion 12 of the assembly is joined to the base segment 34 associated with the bottom portion 14 of the bladder assembly shown in FIGS. 1 and 2. Hinge springs 33, beside joining the two segments 32 and 34, are arranged to apply a biasing action, either to fully open the assembly in its flat form as shown in FIG. 3 or to close the gate portion 32 in compact overlapping the base 34. In the form of the invention illustrated herein, the assembly is provided the normally open angular relation as shown in FIG. 1 which can be closed by evacuation of the pockets 16 and 18 upon connection to a negative pressure source through a connecting tube 22.

Figure 5:
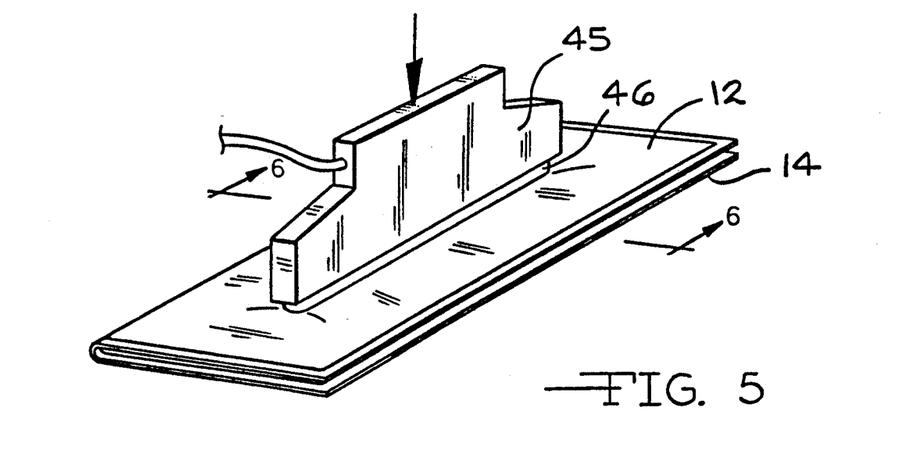
FIG. 5 illustrates in perspective the assembly of FIG. 4 with its two side segments in a closed relation one overlying the other within the flexible bladder envelope to permit interjoinder of the two intermediate layers of the folded envelope along a valley-forming seam according to the method of fabrication of the invention.
Figure 6:
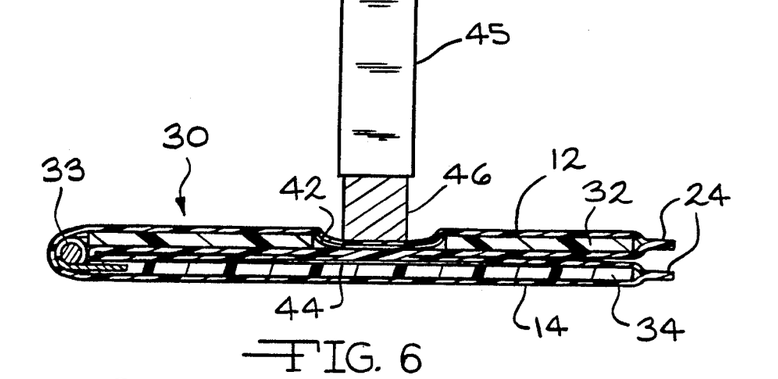
FIG. 6 is an enlarged cross sectional illustration of the flattened assembly of FIG. 5.

The method of forming the seam 19 between the two pocket portions 16 and 18 of the sides 12 and 14 entails bending the internal assembly 50 beyond the partial bend as illustrated at FIG. 4 to a complete foldover and then holding the side 12 in its flat overlapping relationship with the side 14 as shown in FIG. 5. A slot 40 in the upper segment 32 provides indirect access to the inbetween folded portions of the envelope 30 through the outer layer of the envelope when it is in folded condition as shown in FIG. 5. An electrical heating unit 45 having an ironing bar portion 46 presses the outer layer of the envelope 30 through the slot and applies heat and pressure to the foldover portion of the envelope between the segments 32 and 34. Adequate heat and pressure is applied to the foldover portion to effect sealing of the two inner layers together along the line of the ironing bar portion 46. When the Hytrel elastomeric polymer used, has a thickness of approximately 1/16 inch, application of temperature of approximately 360 degrees and a pressure of approximately 60 lbs. per square inch will produce the seal desired. When it is desired to provide a curvalinear shaped seal a correspondingly shaped ironing bar can be utilized.

A strip of separating material 42 adhered to the underside of the overlying portion of the envelope allows application of heat and pressure to the overlayer without the overlayer portion becoming sealed to the foldover portion between the segments 32 and 34. Correspondingly a strip of separator material 44 is provided on the base segment 34 to assure that the foldover portions of the envelope between the overlying segments do not become permanently adhered to the base segment 34. By way of example, the segments 32 and 34 are made of material such as nylon sheet material approximately ⅛ inch thick and the separator strips for keeping the elastomeric polymer of the envelope from fusing it has been found can be of regenerated cellulose tape with a pressure sensitive adhesive layer such as is sold under the name "Scotch tape", a trade mark of the 3M Corporation, Minneapolis, Minn.

Figure 8:
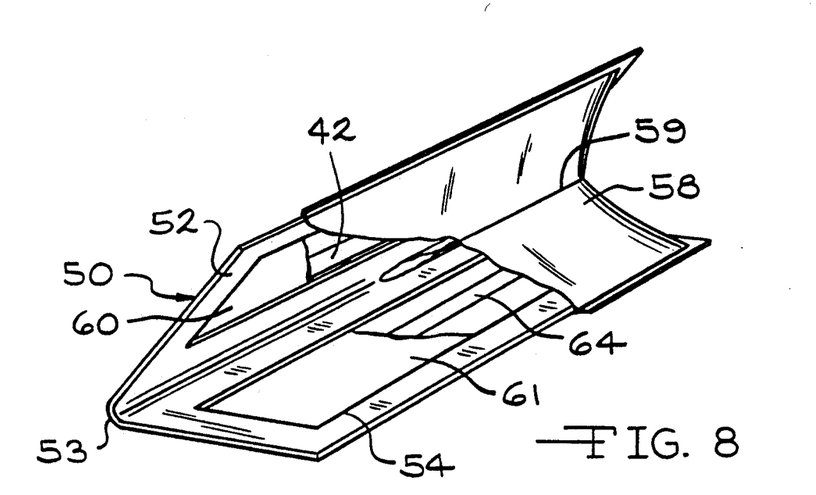
FIG. 8 is a perspective, somewhat schematic broken away view of a bladder assembly like that of FIG. 1 illustrating th side segments with large openings therein and the valley relation of the flexible membrane portions extending between the biased segments.

The insert 7 is made up of segments 52 and 54 which are joined at a hinge 53 built integrally in the insert. The hinge can have built therein a normal angular relationship between the segments 52 and 54 such that upon being bent from the normal angle an internal stress will act to tend to bring the insert back to its normal set angular relation. The insert 50 can be formed with a permanent angle of anywhere from about 90 degrees and a flattened condition from which inflation of the bladder will effect an opening of the assembly.

The segments 52 and 54 can each be provided with a wide opening in place of a slot to reduce the amount of segment material necessary for an operable valve assembly. A seam 59 in the foldover region of the bladder envelope 58 can be formed in the same manner as described above. In this arrangement, however, beside the separator strip 62 being associated with the underside of the envelope 58 to prevent joinder of the seam region to the underside of the envelope overlying the opening 60, another separator strip 64 is provided on the inner side of the envelope portion extending across the opening 61.

Figure 7:
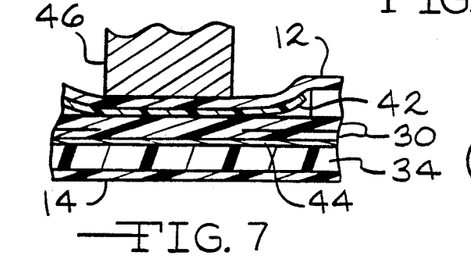
FIG. 7 is an enlarged view of a portion of FIG. 6.
Figure 7A:
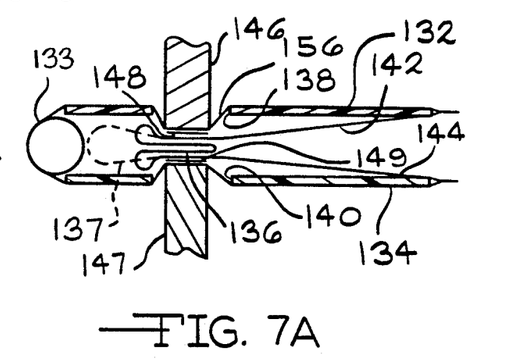
FIG. 7A is a cross diagrammatic illustration of an arrangement like that of FIG. 6 in which the bladder layers lying between the insert segments are fused by application of heat and pressure from both top and bottom of the assembly.

FIG. 7A is a diagrammatic illustration of a bladder assembly 100 including a top segment 132 and a bottom segment 134 having openings 138 and 140 respectively through which openings sealing tools 146 and 147 can provide heat and pressure from both the top and bottom of the assembly respectively to fuse the layer of the bladder 156 inbetween the folded segments 132 and 134. The segments 132 and 134 are hinged in spring biased relation in the hinge region 133 as in the arrangement of FIG. 4. With this arrangement, the portion of the folded bladder located in the region between the seal and the hinged edges of the insert is folded inwardly as a tongue-like extension portion 136 immediately between the bladder layers 142 and 144 which in turn are located between the folded segments 132 and 134. Strips 148 and 149 of separator material are located on the interior surfaces of the bladder 156 in the region under the ends of the sealing tools 146 and 147, respectively, to allow fusion of the extension 136 and the folded interior bladder layers 142 and 144 without causing adherence to the exterior layers of the bladder.

By fusing the tongue-like portion 136 between the layers 142 and 144 in forming the seam extending parallel to the hinge region 133, the excess bladder material 137 which would otherwise reside between the seam and the hinge region is thus removed as a resistance to fluid flow. Such removal it has been found facilitates evacuation of the bladder and makes it possible for the assembly to be folded into a more completely flattened condition because of removal of the obstruction from the hinge region.

Figure 9:
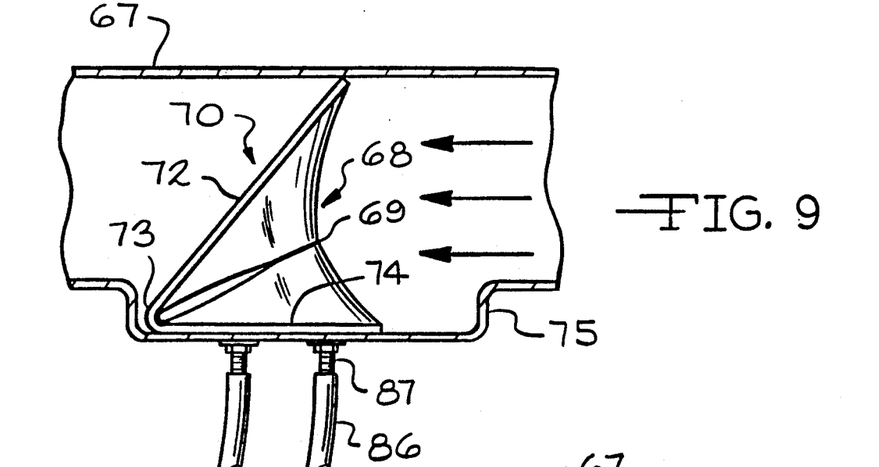
FIG. 9 is a schematic illustration of another arrangement of the bladder assembly of FIGS. 1 and 8 in which two sources of evacuation of the bladder are provided enabling multipositioning of the gate portion of the assembly.
Figure 10:
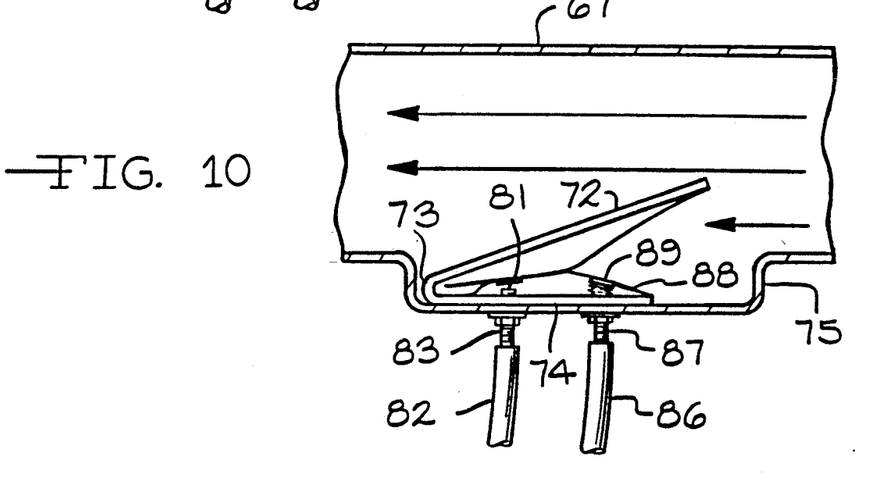
FIG. 10 is a view of the bladder assembly of FIG. 9 shown with the gate portion drawn to a midposition.

FIGS. 9 and 10 illustrate schematically how a flexible bladder valve of the present invention can be drawn by suction, i.e. negative pressure, to a fixed intermediate position of partial closure in addition to being capable of being drawn to a fully closed position. In this regard FIG. 9 illustrates a flexible valve 70 with its base 74 mounted in a recess 75 in a duct 67. The valve 70 is shown in its normally open position having a gate side 72 joined to the hinge region 73 connected to the base 74. The flexible conformable fluid portion forming a valley between the two sides 72 and 74 is formed in the envelope 68 by provision of a seam 69. A midposition suction tube 86 is connected to a hollow connecting set screw and nut 87 which is sealed to the base side 74 of the bladder assembly and has a projecting outlet portion 88 on the interior of the base. The outlet 88 projects to a position such that as the envelope 68 is drawn by suction through the tube 86, the side 72 moves closer to the base 74 until the membrane portion immediately above communicates with the outlet to stop continued withdrawal of gas from the interior of the bladder. The projecting outlet ca be adjusted in its height to provide different degrees of closure of the gate side 72. A stopper or fluid flow blocking patch member 89 both stops the flow of fluid and reinforces the interior of the envelope membrane 68 to assure a positive closure of the outlet 88 as well as reducing wear on the interior surface of the envelope 68 in the region of closure.

Figure 11:
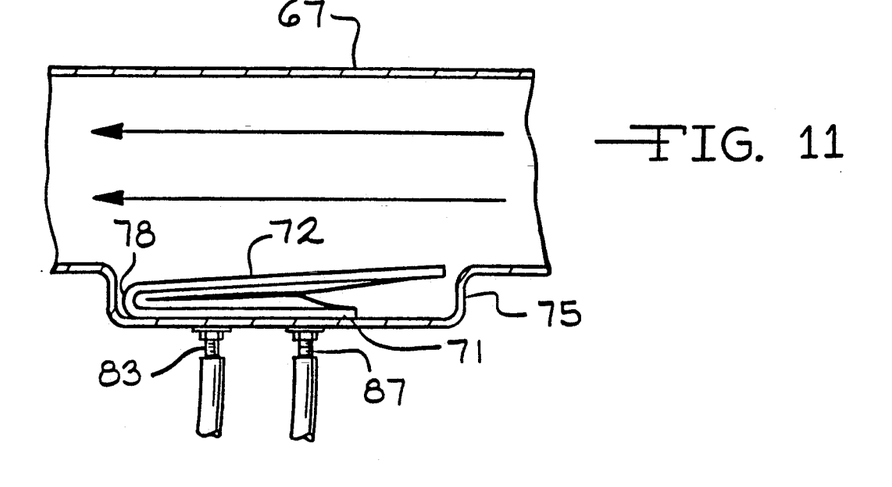
FIG. 11 is a view of the bladder assembly of FIGS. 9 and 10 drawn to a closed position.

When the valve is to be collapsed still further than the partial collapse accomplished through the outlet 88, another suction tube 82 is provided connected to the interior of the bladder by way of a hollow adjustable screw and nut 83 having an outlet 81 also adjustable in height on the interior of the bladder in a location spaced from the outlet 88 and closer to the hinged region 73. Further evacuation of fluid from the interior of the bladder through the suction tube 82 will draw the envelope portion still further toward the base 74. A second stopper patch 84 located on the interior of the bladder envelope is positioned to effect closure of the outlet 81 when the side 72 is drawn to the desired closed position relative to the base 74. In some instances where desired, the projection of the outlet 88 can be made collapsible such as by providing an outlet 81 at the top of a corrugated plastic tube which can be collapsed upon withdrawal of additional gaseous fluid through the outlet 81. In this way the valve arrangement of the invention provides two settings for closure of the sides of the assembly, one being a partial midregion closure setting and the other a complete closure as shown in FIG. 11. Additional outlet tubes can be provided for additional steps of closure having outlets suitably located for the desired closure settings.

Figures 12, 13, 14:
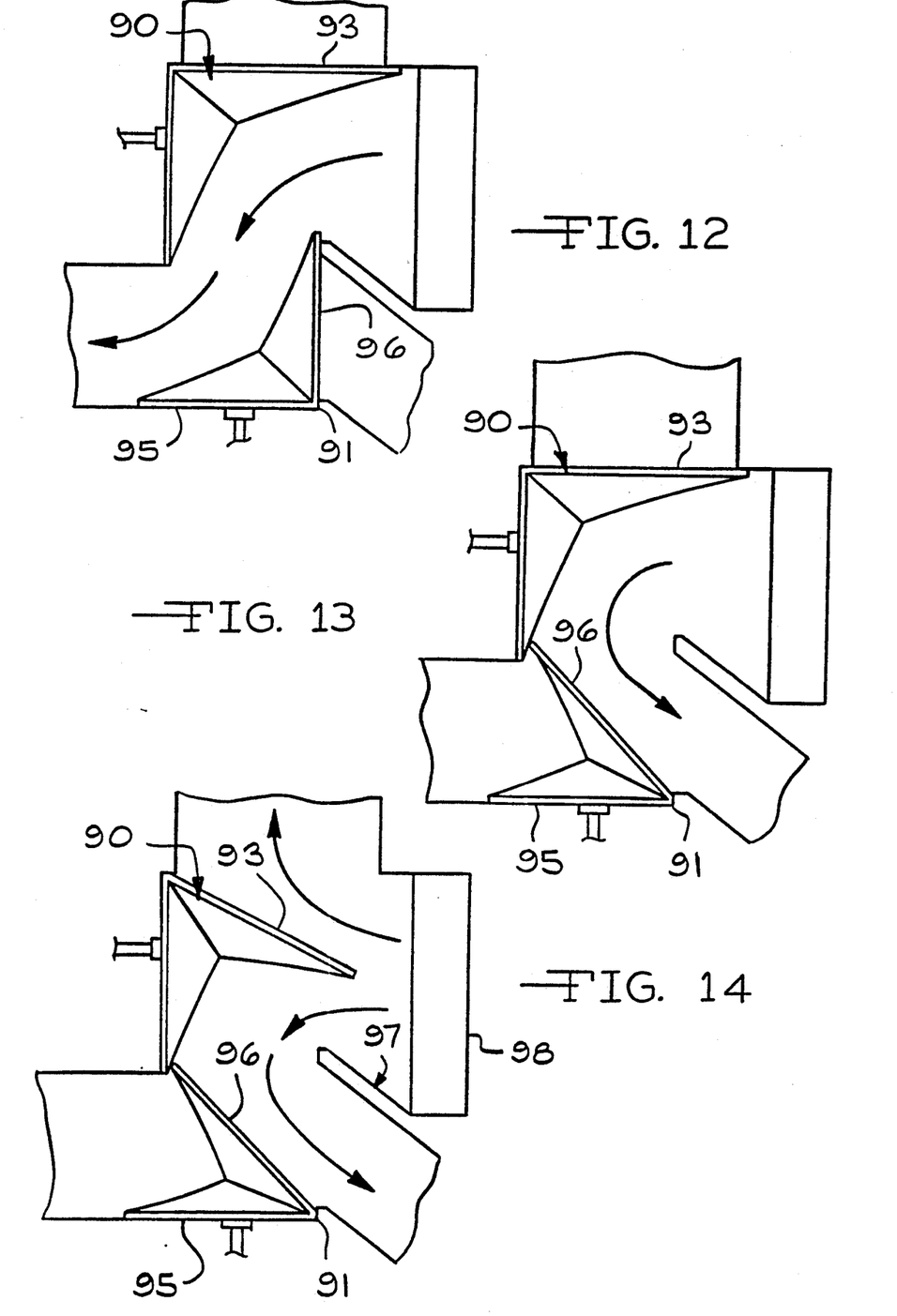
FIG. 12 is a schematic illustration showing how two bladder assemblies of the present invention can be set in an automotive heating and cooling air conditioning system to supply air for windshield defrosting.
FIG. 13 is an illustration of the arrangement of FIG. 12 with the bladder assemblies set in a full heating mode.
FIG. 14 is an illustration of the arrangement of FIGS. 12 and 13 with the bladder assemblies set for bi-level supply of conditioned air.

FIGS. 12, 13 and 14 illustrate a manner in which two flexible bladder valves of the present invention can be operated in automotive heating and air conditioning duct systems to effect the conventional heating and air conditioning functions of such systems. FIG. 12 illustrates the use of two bladder assemblies 90 and 91 mounted on their bases 92 and 95, respectively, and so arranged with the vent section 98 and the duct system 96 so that they can be selectively operated to provide full air conditioning, full heating, windshield defrosting, or bi-level supply of conditioned air.

FIG. 12 illustrates the bladder 90 with its blade 93 in closed position over the air conditioning flow duct while the blade 96 of the bladder 91 is closed over the heat duct. With this arrangement the air from the fan section is fed to the defrost duct as represented by a flow arrow. FIG. 13 illustrates that upon withdrawal of fluid from the bladder valve 91 its blade 96 can be drawn to a closed position over the defrost duct and thereby position the system for full heat to the passenger chamber. FIG. 14 illustrates that closure of the defrost duct by operation of the bladder valve 91, and by collapsing the bladder 90 to a midposition in the air flow stream of the fan section, air can be supplied to both the air conditioning and heating ducts in bi-level fashion. Full operation of the bladder valve 90 in which the blade section 93 is moved through its full travel to bypass the heating duct results in full supply of air to the air conditioning duct.

The bladder system is designed so that in the event gasses cease to be withdrawn from the bladders 90 and 91 there will return to their normal starting positions illustrated in FIG. 12. The description relative to the arrangement of FIGS. 12 to 14 are illustrative of the flexibility of use of the flexible bladder valves of the present invention. In this respect it will be understood that many variations of the disclosed invention can be made within the broad scope of the principles embodied therein. Thus while particular preferred embodiments have been shown and described, it is intended by the appended claims to cover all such modifications which fall within the true spirit and scope of the invention.

I claim:

1. A fluid inflatable bladder assembly for use in controlling flow of fluid in a fluid flow passage comprising a bladder of fluid conformable impermeable material, an insert incorporated in said bladder comprising two segments of rigid sheet material extending from a bending region inbetween, said two segments being moveable about said bending region between a predetermined wide angular relationship to each other and a close overlapping relationship, said segments having inner surfaces confronting each other in said close relation and outer surfaces located on the sides opposite said inner surfaces, said segments having outer edges opposite said bending region and end edges at opposite ends of said bending region, said bladder being closely fit over said insert in overlapping relation with said inner and outer surfaces, the portions of said bladder over said confronting inner surfaces being joined along a seam extending generally parallel to said bending region, said seam being so located between said bending region and said outer edges such that the wide angle between said segments is limited to said predetermined angle, said seam between said outer edges when said segments are in their wide angle relation being drawn in tight fit tensioned relation with said end regions of said segments thereby imparting a valley-shaped depression to the bladder portion between said outer edges, and connection means associated with said bladder for connecting a fluid pressure source to said bladder for inflating and deflating said bladder for control of fluid flow in said passage.

2. A bladder assembly as set forth in claim 1 wherein said two segments are joined at said bending region at which biasing means is provided arranged to produce an opposing biasing action when said segments are bent from said predetermined angle.

3. A bladder assembly as set forth in claim 1 wherein said segments are biased to said close relationship whereby connection to a supply of inflating fluid will enable inflation of said bladder and separation of said two segments to any desired angular position up to said predetermined open angular relationship.

4. A bladder as set forth in claim 1 including biasing means at said bending region biasing said segments toward said predetermined wide angular relation.

5. A bladder assembly as set forth in claim 4 wherein said biasing means comprise spring members connected to said segments.

6. A bladder assembly as set forth in claim 4 including a source of negative pressure connected to said connection means whereby said two segments can be drawn to any desired angular relation to each other to said close overlapping relationship.

7. A bladder assembly as set forth in claim 6 wherein one of said segments comprises a base for mounting said assembly in a passage while the other segment comprises a gate of said assembly moveable angularly about said base portion within said passage, said gate portion being of size and shape matched to said passage to provide the desired control of fluid flow in said passage.

8. A bladder assembly as set forth in claim 7 wherein said gate is larger in size than said base portion.

9. A bladder assembly as set forth in claim 7 wherein said base is mounted in a matching recess provided in a wall of said passage to reduce the obstruction to flow offered by said mounted assembly.

10. A bladder assembly as set forth in claim 7 wherein said connection means includes an opening to the interior of said bladder in said base portion.

11. A bladder assembly as set forth in claim 10 wherein said opening is located in said base where upon withdrawal of gaseous fluid therethrough from said bladder under the influence of connection of a negative pressure source to said connection means the opening is blocked to further gas flow therethrough at a preselected position of said gate by movement of an overlying portion of one of said two layers into blocking communication with said opening.

12. A bladder assembly as set forth in claim 11 wherein said overlying portion of said two layers is provided with a patch of wear resistant material and which facilitates blockage of flow through said opening.

13. A bladder assembly as set forth in claim 11 including at least one additional connection means for connection to a negative pressure source, each said additional connection means having a respective opening located in said base where upon withdrawal of gaseous fluid therethrough from said bladder said respective opening is blocked at a different preselected position of said gate by movement of a another overlying portion of said one of said two layers into blocking communication with said respective opening.

14. A bladder assembly as set forth in claim 10 wherein said opening included in said connection means is adjustable in height on the interior of said bladder.

* * * * *